United States Patent [19]

Paton et al.

[11] 4,292,497

[45] Sep. 29, 1981

[54] PULSED ARC WELDING AND SURFACING APPARATUS

[76] Inventors: Boris E. Paton, ulitsa Chkalova, 41a, kv. 26; Vladimir K. Lebedev, ulitsa Engelsa, 25, kv. 12; Pavel P. Sheiko, prospekt Nauki, 19/3, kv. 16; Mikhail P. Pashulya, ulitsa Konstantinovskaya, 61, kv. 11, all of Kiev, U.S.S.R.

[21] Appl. No.: 8,561

[22] Filed: Feb. 1, 1979

[51] Int. Cl.³ .................................... B23K 9/09
[52] U.S. Cl. ...................... 219/130.51; 219/130.31
[58] Field of Search .......... 219/130.1, 130.51, 130.31, 219/137 PS

[56] References Cited

U.S. PATENT DOCUMENTS 3,524,041  8/1970  Manz .............................. 219/130.51
3,718,802  2/1973  Manz .............................. 219/130.51

FOREIGN PATENT DOCUMENTS 256134  3/1970  U.S.S.R.

OTHER PUBLICATIONS

M. P. Zaitsev et al., "Supply & Control Station for Pulsed Argon–Arc Welding Based on a Thyristor Converter", Svar. Proiz., 1972, No. 5, pp. 45–47.

Primary Examiner—C. C. Shaw
Attorney, Agent, or Firm—Steinberg & Raskin

[57] ABSTRACT

A power circuit combined with a power circuit control unit includes a single-phase leakage output voltage regulated transformer having a primary winding connected to a power supply and a secondary winding connected to a controlled bridge rectifier. Connected to outputs of the controlled rectifier are a variable resistor, an induction coil with non-linear variable inductance, and an integrator, each being electrically connected to an electrode and to an article being treated. The power circuit control unit acts on the power circuit to permit the welding arc to be fed a current the variation of which can be represented as a sum curve of a direct current component and a periodic curve, having its leading edge rising approximately linearly and its trailing edge falling approximately exponentially.

8 Claims, 31 Drawing Figures

PULSED ARC WELDING AND SURFACING APPARATUS

BACKGROUND OF THE INVENTION

1. Field of the Invention

The present invention relates to electric arc welding, and more particularly, to an apparatus for pulsed arc welding and surfacing of articles.

The invention is well adapted for use in the machine-building and ship-building industries, in the aircraft-and automobile manufacturing industries, as well as in the construction industry and during repair works where welding and surfacing are carried out, utilizing consumable and non-consumable electrodes in a protective gas medium, under flux, under water, as well as in unshielded arc welding and surfacing processes effected, in various spatial arrangements of electrodes.

The invention is also applicable for use in piece covered-electrode welding and surfacing, permitting various spatial arrangements of electrodes.

Applying pulses to a constant current in the process of arc welding facilitates the breaking-off of metal drops from the electrode and speeds up transfer of said drops to the welding bath.

2. Description of the Prior Art

There are known in the art apparatus for pulsed arc welding and surfacing of articles, wherein consumable, non-consumable and piece covered electrodes are utilized.

The apparatus of this type generally comprises a constant-current source and a single-pole pulse generator, functioning basically as a welding current modulator.

With the above apparatus, fusion of the electrode metal until formation of a metal drop and its transfer to the welding pool proceeds continuously for the electrode fusion is caused by the constant current.

However, as a result of burning-out of the electrode components, which is characteristic of the above process, the strength of the weld lowers, which occurs in particular in the case of welding articles made from aluminium-magnesium alloys, more than 2 mm in thickness. USSR Inventor's Certificate No. 256,134 describes an apparatus for pulsed arc welding, which comprises a power circuit, a welding current pulse shaper and a power circuit control unit. The power circuit of the apparatus includes a leakage voltage regulated three-phase step-down transformer. The transformer has its primary winding connected to a power supply. The voltage produced by the secondary winding is rectified by a main rectifier which is a multi-phase fullwave bridge rectifier. The rectifier has its positive output connected through a choke to an electrode, its negative output being electrically connected to an article being treated.

The welding current pulse shaper comprises discharge capacitors placed in circuit of each phase of the three-phase transformer, an additional rectifier coupled to an additional winding of the transformer and having controlled rectifiers or diodes and diodes. The discharge capacitors are connected in parallel through the controlled rectifiers with the main rectifier and a choke. The control unit includes static phase shifters, pulse transformers and circuit breakers. The phase shifters are connected through the pulse transformers and circuit breakers to control electrodes of the controlled rectifiers.

When the transformer is energized, the discharge capacitors are charged through the controlled rectifier to the peak voltage built up in the additional winding of the three-phase transformer. The capacitors are charged alternately during the positive half-period of the supply voltage, during which time the controlled rectifiers remain non-conductive. During the voltage negative half-periods the controlled rectifiers are alternately conducting and the capacitors discharge to feed the welding arc. As a result, high-power single-pole current pulses are formed. In the above apparatus, the controlled rectifiers are controlled by the static phase shifters. The current pulse parameters and pulse frequency may be preset automatically by a program controlling element.

However, with the use of the above-described apparatus, the electrode metal and the metal of the welding bath are acted upon by a current which causes their overheating and partial burning-out of their components, which results in a low-quality weld.

Moreover, to effect pulsed arc welding by the above apparatus, an additional rectifier is needed apart from the main one. The presence of the welding current pulse shaper including the additional rectifier complicates the welding equipment, increases production costs and requires additional production space.

It should also be noted that blocking the main rectifier by the welding current pulse shaper connected in parallel therewith results in a low stability of arcing when welding articles having a thickness less than 2 mm.

SUMMARY OF THE INVENTION

The principle object of the present invention is to provide a pulsed arc welding and surfacing apparatus, wherein the welding current magnitude varies with time so as to enable the electrode melting and cooling to alternate with the electrode feeding rate being constant, and the mean value of voltage across the arc to be maintained constant irrespective of disturbances.

Another object of the present invention is to provide a pulsed arc welding and surfacing apparatus permitting the quality of welds to be improved.

Still another object of the present invention is to bring down cost and simplify the construction of equipment for pulsed arc welding.

These and other objects of the invention are attained in that in a pulsed arc welding and surfacing apparatus comprising a power circuit, a power circuit control unit, the power circuit includes a output voltage regulated leakage transformer having a primary winding connected to a supply circuit and a secondary winding connected to a controlled bridge rectifier having controlled rectifiers electrically connected to outputs of the control unit, the positive output of the controlled bridge rectifier connected to a choke electrically coupled to the electrode and the negative output thereof electrically connected to an article being treated. In accordance with the invention, the transformer in the power circuit is constructed as a single-phase one, the choke is an induction coil with variable non-linear inductance. A variable resistor is connected between the controlled rectifier outputs for regulating the output voltage of the apparatus as the moments of no-load running thereof. An integrator having a variable resistor, capacitor and a diode is connected in series with the induction coil. In the integrator, one lead of the variable resistor is connected to said induction coil, the capacitor is connected between the other lead of said variable resistor and a negative output of the controlled bridge rectifier, and the diode is connected with a polarity preventing the capacitor discharge current from passing therethrough and shunts a portion of the variable resistor, which is connected between the sliding tap thereof and the induction coil. The power circuit control unit acts upon the power circuit so as to permit the welding arc to be fed with a current, the variation of which in time can be represented as a sum curve of a direct-current component and a periodic curve, having its leading edge rising approximately linearly and its trailing edge falling approximately exponentially.

The apparatus of the invention simplifies the welding equipment and allows its cost to be brought down and the production space occupied by the apparatus to be reduced.

It is expedient that the apparatus include a diode having an anode connected to the negative output of the controlled bridge rectifier and a cathode connected to the positive output thereof.

The apparatus of the invention improves the reliability of the controlled bridge rectifier by relieving it of the welding current in the absence of the pulsed voltage at its outputs.

It is advisable to form the apparatus so that in said induction coil having a variable non-linear inductance, the ratio of non-saturated inductance to the saturated inductance would exceed 40.

The above range of inductance variation enables intermittent alternating of electrode melting and cooling intervals.

It is also expedient that in the proposed apparatus the power circuit control unit would include a series connected unit for measuring the mean arc voltage value, comprising series connected integrators and whose outputs serves as the outputs of the power circuit control unit, and a unit for switching off the automatic control of the arc voltage mean value at moments when the electrode is short-circuited to an article, which unit having its outputs connected to the supply circuit of a voltage pulse shape relaxation converter and of a first unbalancing signal amplifier to whose input are connected in opposed relationship a stable frequency sawtooth voltage generator, and a resistor-type voltage divider, and whose output is connected to an input of the voltage pulse shape relaxation converter. The power circuit control unit comprises a unit for setting the mean value of the arc voltage, the output of which through the resistor-type voltage divider is connected as well as an output of the voltage pulse shape relaxation converter to an input of an unbalancing signal second amplifier to the output of which are connected in series an inverter, differentiating network and a blocking generator whose output are the outputs of the power circuit control unit.

The power circuit control unit of the invention permits the mean value of the arc voltage constant to be automatically maintained despite disturbances occurring in the course of welding.

It is expedient that the power circuit control unit include a stable frequency sawtooth voltage generator and a resistor-type voltage divider. The sawtooth generator and voltage divider have their outputs connected in opposed relationship to the inputs of the first unbalancing signal amplifier whose output is connected to the input of the voltage pulse shape relaxation converter. A square pulse generator whose output is in opposed relationship with the output of the voltage pulse shape relaxation converter is connected to the input of the second unbalancing signal amplifier to whose output are connected in series an inverter, a differentiating network, and a blocking generator the outputs of which are the outputs of the power circuit control unit.

Such construction of the power circuit control unit permits the welding to be done using piece electrodes designed for both DC and AC welding, the makes it possible to raise the thermal resistivity, for example, of tungsten electrodes with the welding current corresponding to the voltage of inverse polarity.

These and other objects and advantages of the present invention will become more apparent by reference to the following description of embodiments of the invention taken in conjunction with the accompanying drawings.

The invention will now be explained in greater detail with reference to the preferred embodiments thereof which are represented in the accompanying drawings wherein.

DETAILED DESCRIPTION OF THE INVENTION

Figure 1:
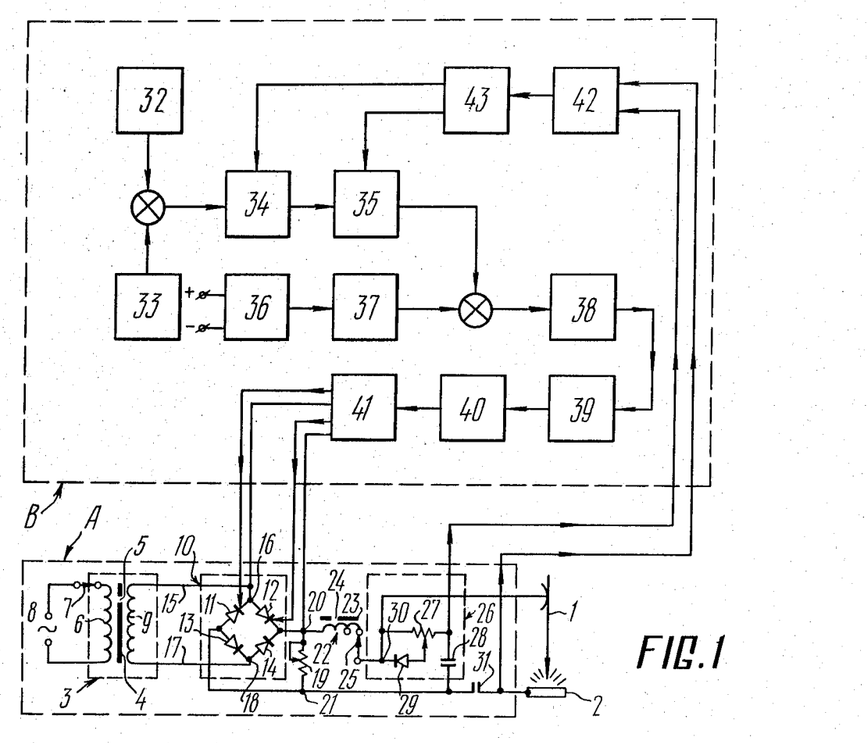
FIG. 1 is a black and circuit diagram of an embodiment of the pulsed arc welding and surfacing apparatus of the present invention.

The apparatus of the invention, shown in FIG. 1, comprises a power circuit A and a power circuit control unit B.

The power circuit A provides for a continuous arcing between an electrode 1 and an article 2 in accordance with a preset program for varying the welding current and comprises a single phase step-down transformer 3 with a magnetic core 4 having an air gap 5. A primary winding 6 of the transformer 3, whose number of turns is varied with the aid of a switch 7, is connected to an AC power source 8. Connected to a secondary winding 9 of the transformer 3 is a controlled rectifier 10 constructed in the form of a bridge network including two controlled rectifiers or controlled diodes, such as, for example, thyristors 11 and 12, and two uncontrolled valves, namely, diode 13 and 14. One terminal 15 of the transformer 3 secondary winding 9 is connected to a junction point 16 of the thyristors 11 and 12, and its second terminal 17 is connected to a junction point 18 of the diodes 13 and 14. Positive and negative outputs of the controlled rectifier 10 are connected to a variable register 19 at points 20 and 21 of the circuit, respectively. An induction coil 22 with a variable non-linear inductance, having a magnetic core 23 with an air gap 24, is also connected to the circuit point 20. The number of the induction coil 22 turns is varied with the aid of a switch 25. Connected in series with the induction coil 22 is an integrator 26 including a variable resistor 27, a capacitor 28 and a diode 29. One lead of the variable resistor 27 is connected at a point 30 to the switch 25 and the other lead of said resistor is connected to one of the plates of the capacitor 28. The other plate of the capacitor 28 is connected at the point 21 of the circuit to the negative output of the controlled rectifier 10. The anode of the diode 29 is connected to a sliding tap of the resistor 27 and its cathode is connected to the point 30 of the circuit, thereby shunting that section of the variable resistor 27, which is connected between the sliding tap thereof and the point 30 of the circuit. The outputs of the controlled rectifier 10 are connected at the circuit points 30 and 21 to the electrode 1 and via a contactor 31 intended for closing and breaking the welding circuit, to the article 2 to be welded, respectively.

In the preferred embodiment of the invention, the control unit B of the power circuit A is an arc voltage feedback circuit and comprises, in accordance with the invention, a stable frequency sawtooth voltage generator 32 and a resistor-type voltage divider 33, both of which are connected to inputs of a first unbalancing signal amplifier 34 so that their output voltages are subtracted. The output of the first unbalancing signal amplifier 34 is connected to an input of a voltage pulse shape relaxation converter 35.

The power circuit control unit also includes a unit 36 for setting a mean arc voltage value, fed by a stabilized direct current source, which may be any known in the art stabilized power supply source suitable for the purpose. Connected to the output of the unit 36 is a resistor-type voltage divider 37.

The output of the voltage pulse shape relaxation converter 35 and the output of the resistor-type voltage divider 37 are connected to the inputs of a second unbalancing signal amplifier 38 so that voltages at said outputs are subtracted. To the output of the amplifier 38 is connected a circuit comprising an inverter 39, a differentiating network 40 and a blocking generator 41 connected in series and having its output coupled to the control electrodes of the thyristors 11 and 12, to the junction point 16 of said thyristors and, at the circuit point 20, to the positive output of the controlled rectifier 10.

In addition, the control unit B of the power circuit A includes a unit 42 for measuring the mean arc voltage value, having its inputs electrically connected to the plates of the capacitor 28. The connection may be effected either by direct connection of the unit 42 inputs to the capacitor 28, or by connecting one of the unit 42 inputs to the respective plate of said capacitor via the contactor 31, if included.

The outputs of the unit 42 are connected to a unit 43 intended for cutting off the automatic control of the mean arc voltage in case the electrode 1 is short-circuited with the article 2. The unit 43 outputs are connected to supply circuits of the first unbalancing signal amplifier 34 and of the voltage pulse shape relaxation converter 35.

Figure 2:
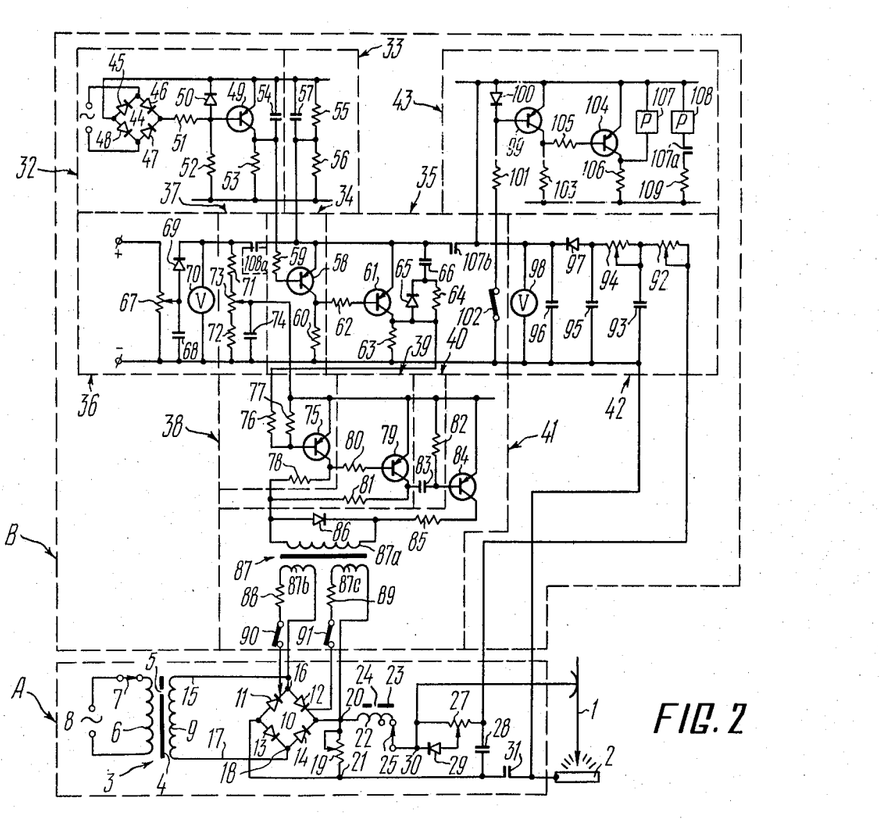
FIG. 2 is a circuit diagram of the apparatus of FIG. 1.

FIG. 2 is a circuit diagram of the pulsed arc welding and surfacing apparatus of FIG. 1.

The stable frequency sawtooth voltage generator 32 includes, according to the herein disclosed embodiment of the present invention, a full-wave rectifier 44 constructed in the form of a bridge network including diodes 45, 46, 47 and 48. The rectifier 44 output is connected to a transistor 49 having a diode 50, resistors 51, 52, 53 and a capacitor 54, all connected as shown in FIG. 2. The components 44 to 53, form the sawtooth voltage generator 32, the constructional principle of which is well known to those skilled in the art.

The resistor-type voltage divider 33 comprises resistors 55 and 56 and a capacitor 57 connected in parallel with the resistor 55.

The first unbalancing signal amplifier 34 is intended for amplifying the difference between the output voltage across the capacitor 54 of the generator 32 and the output voltage across the capacitor 57 of the resistor-type voltage divider 33. The amplifier 34 includes a transistor 58 and resistors 59 and 60 to form a voltage amplifying stage. The output of the generator 32 is connected via the resistor 59 to the base electrode of the transistor 58 and the output of the resistor-type voltage divider 33 is connected to the emitter electrode of the transistor 58.

The voltage pulse shape relaxation converter 35 comprises a transistor 61 the base circuit of which includes a resistor 62 having one lead coupled to the collector electrode of the transistor 58. The converter 35 also includes a resistor 63 connected to the collector electrode of the transistor 61, a parallel-connected resistor 64 and diode 65, which together with a capacitor 66 form a series circuit connected between the emitter and the collector electrodes of said transistor.

The unit 36 for setting the mean arc voltage value comprises a variable resistor 67 whereto a stabilized direct current is applied, a capacitor 68 and a diode 69. The value of the voltage being set can be measured with the aid of a voltmeter 70.

The resistor-type voltage divider 37 comprises resistors 71 and 72, a variable resistor 73 and a capacitor 74. The circuit of such voltage divider is well known in the art. As shown in the FIG., the resistors 71, 73 and 72 are connected in series, whereas the capacitor 74 is connected in parallel with the resistor 72 and to a portion of the variable resistor 73.

The embodiment of FIG. 2 of the control unit B of the power circuit A also includes a second unbalancing signal amplifier 38, which is also well known in the art. As shown in FIG. 2, the amplifier 38 comprises a transistor 75 and resistors 76, 77 and 78. The output of the voltage pulse shape relaxation converter 35 is connected to a resistor 76, and the output of the resistor-type voltage divider 37 is connected to the resistor 77. Connected to the output of the amplifier 38 is the inverter 39, comprising a transistor 79 and resistors 80 and 81. The inverter 39 has its output connected to the differentiating network 40 comprising a resistor 82 and a capacitor 83. The output of the differentiating network 40 is connected to a blocking generator 41 comprising a transistor 84, a resistor 85, a diode 86, a transformer 87, resistors 88 and 89 and switches 90 and 91. The emitter and base electrodes of the transistor 84 are connected to the resistor 82 and the collector electrode of said transistor is coupled to the resistor 85. The diode 86 is connected in series with the resistor 85 and shunts the primary winding 87a of the transformer 87. A terminal of the primary winding 87a is connected to the resistors 78 and 81. Connected in series with the secondary windings 87b and 87c of the transformer 87 are the resistors 88 and 89, which through the swithces 90 and 91 respectively are coupled to the control electrodes of the thyristors 11 and 12. The other terminals of the secondary windings 87b and 87c are connected to the junction point 16 of the thyristors 11 and 12 and to the positive output of the controlled rectifier 10.

The unit 42 for measuring the mean arc voltage value comprises two series connected integrators each formed by a variable resistor 92 and a capacitor 93, and a variable resistor 94 and a capacitor 95 respectively, and also includes a capacitor 96 and diode 97. The measured voltage value can be visually controlled with the aid of a voltmeter 98 which is connected, as shown in FIG. 2, in parallel to the capacitor 96. The resistor 92 is connected to the plate of the capacitor 28, whereas the capacitor 93 is electrically connected to the article 2.

The unit 43 for cutting off the automatic control of the mean arc voltage when the electrode 1 is short-circuited with the article 2 to be welded, comprises a transistor 99, between the emitter and base electrodes of which is a diode 100. The anode of the diode 100 is connected to the emitter electrode of the transistor 99. One lead of a resistor 101 is connected to the base electrode of the transistor 99 and the other lead of said resistor is connected to a lead of a tumbler switch 102.

The other lead of the tumbler switch 102 is electrically connected to the article 2 and the resistor 63. A resistor 103 is connected to the collector electrode of the transistor 99. The unit 43 also includes a transistor 104 having its base electrode connected through the resistor 105 to the collector electrode of the transistor 99. The emitter electrodes of the transistors 99 and 104 are combined. A resistor 106 is connected to the collector electrode of the transistor 104. The other leads of the resistors 103 and 106 are combined. An electromagnetic relay 107 is placed between the emitter and collector electrodes of the transistor 104. The electromagnetic relay 107 has two normally open contacts 107a and 107b. Connected in parallel with the transistor 104 and the resistor 106 is a circuit including a series connected electromagnetic relay 108, the normally open contact 107a and a resistor 109. The normally open contact 107b is connected between the emitter electrode of the transistor 61 and the cathode of the diode 97 and the normally closed contact 108a of the relay 108 is connected between the emitter of the transistor 58 and the resistor 71.

Figure 3:
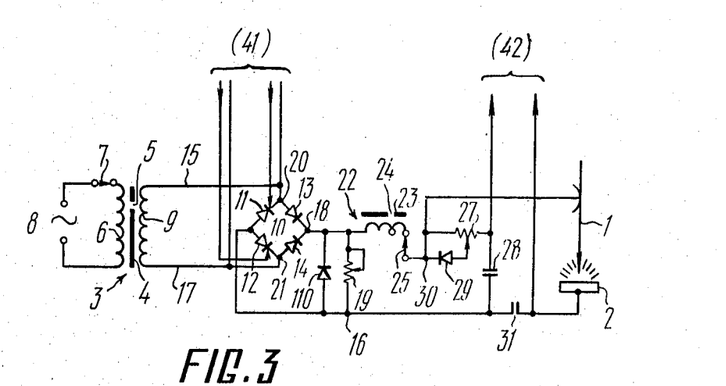
FIG. 3 is a circuit diagram of an embodiment of the power circuit of the pulsed arc welding and surfacing apparatus of the invention.

An alternative embodiment of the power circuit A, as shown in FIG. 3, is also possible, wherein the terminals 15 and 17 of the secondary winding 9 are connected to the junction points 20 and 21 of the controlled rectifier circuit 10, and the points 18 and 16 are respectively the positive and negative outputs thereof. Between the junction points 18 and 16 is placed a power diode valve 110 with its anode connected to the negative output of the controlled output of the rectifier 10.

Figure 4:
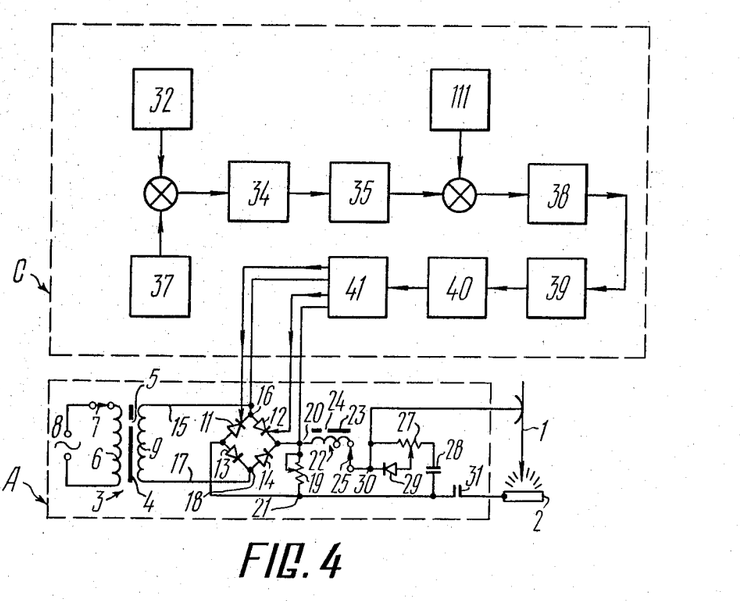
FIG. 4 is a structural diagram of another alternative embodiment of the power circuit control unit connected in the power circuit of FIG. 1 of the invention.

In another embodiment of the control unit of the power circuit A, shown in FIG. 4, said unit comprises the driving generator 32 of a stable frequency sawtooth voltage and the resistive voltage divider 37, both connected to the inputs of the first unbalancing signal amplifier 34 so that their output voltages are subtracted. The output of the amplifier 34 is connected to the input of the voltage pulse shape converter 35.

A square pulse generator 111 and the voltage pulse shape relaxation converter 35 are connected to the inputs of the second unbalancing signal amplifier 38 so that their output voltages are subtracted. To the output of the amplifier 38 is connected a circuit comprising an inverter 39, a differentiating network 40 and a blocking generator 41, connected in series. The blocking generator outputs are connected to the control electrodes of the thyristors 11 and 12, to the junction point 16 of said thyristors, and to the positive output of the controlled amplifier 10 at the point 20 of the power circuit.

If the control unit C (FIG. 4) of the power circuit A is combined with the embodiment of the power circuit A, shown in FIG. 3, the outputs of the blocking generator 41 are respectively connected to the control electrodes of the thyristors 11 and 12 and to the points 20 and 21 of the power circuit.

All the components of the control unit C of the power circuit A, except for the square pulse generator 111, are formed in the power circuit control unit B. The square pulse generator 111 (FIG. 5) comprises a multivibrator having transistors 112 and 113, diodes 114 and 115, resistors 116, 117, 118, 119, 120, 121, 122 and 123, and capacitors 124 and 125.

Figure 5:
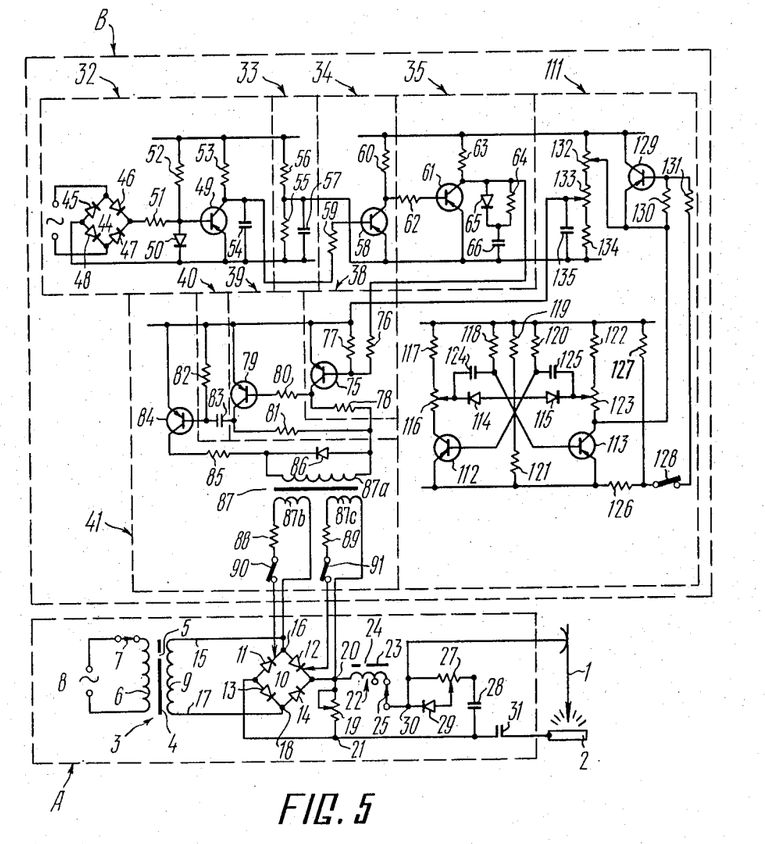
FIG. 5 is a circuit diagram of the pulsed arc welding and surfacing apparatus of the invention comprising the power circuit of FIG. 1 and the power circuit control unit of FIG. 4.
Figure 6A:
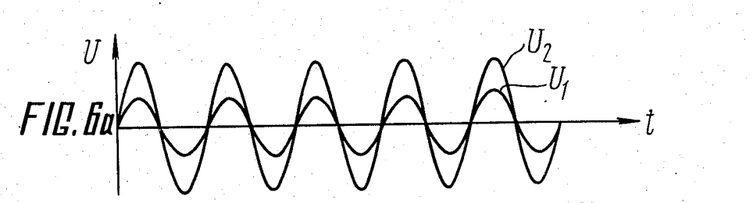
FIG. 6a, 6b, 6c, 6d, 6e, 6f, 7a, 7b, 7c, 7d, 7e, 7f, 8a, 8b, 8c and 8d are time plots illustrating the operation of the apparatus of FIGS. 1 and 2, according to the invention.
Figure 6B:
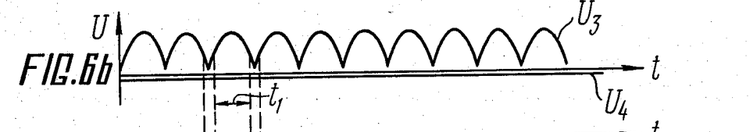
Figure 6C:
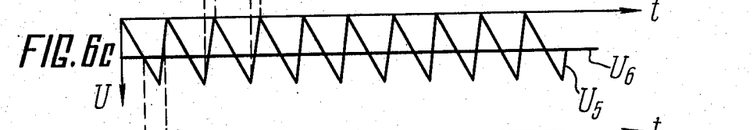
Figure 6D:
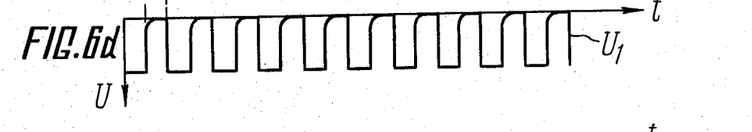
Figure 6E:
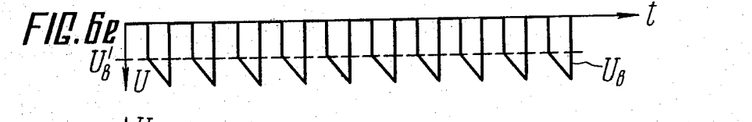
Figure 6F:
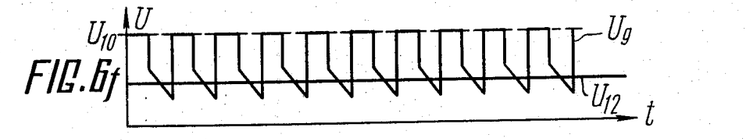

The square pulse generator 111 also includes a resistor-type voltage divider formed by resistors 126 and 127 and connected to the multivibrator and a switch 128 wherethrough the output of said resistor-type voltage divider is connected to a contactless relay having a transistor 129 and resistors 130 and 131. Connected to the output of the contactless relay is a resistor-type voltage divider including variable resistors 132, 133, a resistor 134 and a capacitor 135.

The square pulse generator 111 is well known in the art.

The power circuit may be connected to the electrode 1-article 2 gap through a ballast resistor (not shown in the Figs.) for limiting the welding current value, which is well known to those skilled in the art. It is also evident that with the aid of conventional means the polarity of the voltage applied to the electrode 1 and the article 2 may be reversed.

The operation of the pulsed arc welding and surfacing apparatus, shown in FIG. 1, will now be explained with reference to the time plots of FIGS. 6, 7 and 8.

When alternating voltage $U_1$ (FIG. 6a) synchronized with alternative voltage $U_2$ of the supply circuit 8 is applied to the input of the bridge rectifier 44, there appears a pulsating voltage $U_3$ (FIG. 6b) across the diode 50. The pulsating voltage $U_3$ keeps the transistor 49 non-conducting until its instantaneous value is greater than automatic bias voltage $U_4$ generated by the current circuit of the base of the transistor 49 via the resistor 52. The cutoff time length $t_2$, i,e. the time during which the transistor 49 remains non-conducting, constitutes 0.95 of the half-wave time of the sinusoidal voltage $U_2$ applied to the primary winding 6 of the transformer 3.

During the time $t_1$, the capacitor 54 is charged through the resistor 53 according to a law which is close to the linear law. As soon as the instantaneous value of the pulsating voltage $U_3$ across the diode 50 is less than the automatic bias voltage $U_4$ of the transistor 49, the latter becomes conducting and the capacitor 54 rapidly discharges through the emitter-collector junction of the transistor 49. Thus, a sawtooth voltage $U_5$ (FIG. 6c), whose frequency is double that of the alternating voltage $U_2$ of the supply circuit 8, appears across the capacitor 54. The sawtooth voltage $U_5$ across the capacitor 54 is compared to the direct voltage $U_6$ (FIG. 6c) which renders the transistor 59 non-conducting and which is produced by the resistor-type voltage divider 33 and taken off the capacitor 57. As soon as the value of the sawtooth voltage $U_5$ across the capacitor 54 becomes greater than the direct voltage $U_6$ across the capacitor 57, the transistor 58, which is fed, through the normally open contact 108a, by the mean arc voltage setting unit 36 when the contactor 31 is open, is rendered conducting and as soon as it becomes saturated, a voltage $U_7$ between its emitter and collector electrodes is reduced to zero. When the transistor 58 is conducting, the transistor 61 of the voltage pulse shape relaxation converter 35 is non-conducting and the capacitor 66 is charged through the resistors 63 and 64 according to a law, which is close to the linear law.

At the moment the transistor 61 is driven from conduction to non-conductive state, the voltage value $U_8$ between its emitter and collector electrodes, or the voltage value of the circuit comprising a resistor 64 and a capacitor 66, differs from zero by the magnitude of a drop in the voltage $U_8$ (FIG. 6e) across the resistor 64, since at the moment of commutation the voltage across the capacitor 66 is zero. At the moment of cutting off the transistor 58, the transistor 61 becomes conducting and the capacitor 66 is discharged through its emitter-collector junction and the diode 65, the voltage $U_8$ across the resistor 64 and capacitor 66 decreasing to zero.

Since the resistor 63 serves as an output of the voltage pulse shape relaxation inverter 35 the voltage $U_9$ (FIG. 6f) across said resistor represents the difference between a supply voltage $U_{10}$ (FIG. 6) or $U_{11}$ (FIG. 7a) of the voltage pulse shape relaxation inverter 35 and the voltage $U_8$ across the resistor 64 and the capacitor 66. When the contactor 31 is disconnected, which corresponds to a no-load running of the apparatus, the unbalancing signal amplifier 34 and the relaxation converter 35 are fed the voltage $U_{10}$ generated by the unit 36 for setting the mean arc voltage. When welding is effected, the units 34 and 35 are fed the voltage $U_{11}$ from the output of the unit 42 for measuring the mean arc voltage.

The value of the output voltage $U_9$ across the resistor 63 is compared (FIG. 6f and FIG. 7b) between the emitter and the base electrodes of the transistor 75 of the unbalancing signal amplifier 38 to the output voltage $U_{12}$ (FIG. 6f and FIG. 7b) of the resistor-type voltage divider 37 across the capacitor 74. As soon as the output voltage $U_9$ of the relaxation inverter 35 becomes lower than the voltage $U_{12}$ at the output of the resistor type voltage divider 37, the transistor 75 will become conducting, thereby increasing the difference between $U_9$ and $U_{12}$, and will become saturated. As a result of saturation of the transistor 75, the voltage $U_{13}$ (FIG. 7c) between the emitter and collector electrodes thereof is reduced to zero, and the transistor 79 of the inverter 39 is driven from conduction into its non-conductive state and the voltage $U_{14}$ (FIG. 7d) appears between its emitter and collector electrodes. The voltage $U_{14}$ feeds the collector circuit of the transistor 79. At the moment the transistor 79 is driven from conduction to its non-conductive state, a pulse voltage $U_{15}$ (FIG. 7e) appears at the output of the differentiating network 40, i.e. across the resistor 82. The pulse voltage $U_{15}$ renders conductive the transistor 84 of the blocking generator 41 which operates in the stand-by mode. Pulse current flows through the collector circuit of the transistor 84, the resistor 85 and the primary winding 87a of the transformer 87, whereas in the secondary windings 87b and 87c the pulse voltage $U_{16}$ (FIGS. 7f and 8a) is induced.

The pulse voltage $U_{16}$ is applied through the resistor 83 and the switch 90, and the resistor 89 and the switch 91 to the control electrodes of the respective thyristors 11 and 12 of the controlled amplifier 10. A positive half-wave of alternating voltage $U_{17}$ (FIG. 8b) is applied from the secondary winding 9 of the step-down transformer 3 to the anodes of the thyristors 11 and 12 at the moment current passes through the circuit of their control electrodes. The thyristors 11 and 12 become conducting and at the output points 20 and 21 of the controlled amplifier 10 there appears a voltage $U_{18}$ pulse (FIG. 8c).

At each half-period of the alternating voltage $U_{17}$, the respective thyristor 11 or 12 is rendered conducting.

With the contactor 31 being disconnected during the time $\tau_1$ (FIG. 8c) of the passage of the voltage $U_{18}$ pulse, the capacitor 28 is charged through the induction coil 22, the switch 25 and the resistor 27, and then through the section of the resistor 27, the valve 29, the switch 25, the induction coil 22 and the resistor 19 is discharged within the time $\tau_1'$ when the pulse is absent. Since the resistance value of the resistors 19 and 27 is rated on the basis that the charging time of the capacitor 28 is much shorter than its discharging time, the direct voltage across said capacitor exceeds the mean value of the pulse voltage $U_{12}$, but is less than its peak value.

At the moment of closing the contactor 31 and shorting the electrode 1 with the article 2, with the voltage $U_{12}$ at the outputs of the controlled rectifier, the current magnitude in the circuit including the induction coil 22, the switch 25, the shorted gap electrode 1-article 2, and the closed contactor, is zero. This is accounted for by the fact that if the commutation takes place within the time $\tau_1$ when the voltage $U_{18}$ pulse is applied, the current in the inductive circuit can not instantaneously assume a limit value, and if the commutation occurs within a time $\tau_1'$, i.e. when the voltage $U_{18}$ is zero, the current in said circuit will also be zero; the welding arc is not reignited.

However, if at the moment of closing the contactor 31 and shorting the electrode 1 with the article 2 the current in the circuit of the induction coil 22 is zero, the current magnitude in the electric circuit of the capacitor 28, the resistor 27 portion adjacent thereto, the diode 29, the shorted gap electrode 1-article 2, and the closed contactor 31, assumes its maximum magnitude which is determined by the parameters of said circuit, since the preliminary charged capacitor 28 begins to discharge and the energy stored therein is converted to heat at the place of contact of the electrode with the article 2. Due the action of the discharge current of the capacitor 28, the tip of the electrode 1 is heated, melts in permissible limits, and as a result a welding arc is ignited between the electrode 1 and the article 2.

The welding arc thus formed is fed the pulse voltage $U_{18}$ produced at the outputs of the controlled rectifier 10. At the moment the thyristor 11 or 12 is rendered conductive, the magnitude of the welding current I (FIG. 8d) in the circuit having inductance, that is, electromagnetic inertia begins to increase smoothly according to a law which is close to the linear one. As the welding current passes during the time $\tau_1$ of the voltage $U_{12}$ pulse, the energy builds up in the magnetic field of the induction coil 22.

As soon as the pulse voltage $U_{18}$ is zero, the induction coil 22 begins to release into the welding circuit the energy stored in its magnetic field. In compliance with Lenz's law, a self-inductive e.m.f. appears at the terminals of the induction coil 22. The self-inductance e.m.f. maintains the current I in the welding circuit in the same direction. The welding current passes through the uncontrolled diode valves 13 and 14, and its value decreases according to an exponential law. Since during the time $\tau_1'$, when the voltage $U_{18}$ at the output of the controlled rectifier 10 is zero, the induction coil does not fully release the energy of its magnetic field into the welding circuit, the value of the welding current I at the moment of the arrival of the next voltage $U_{18}$ pulse differs from zero by the value $I_o$ (FIG. 8d) which is always greater than that which is necessary for arcing.

The presence of the pedestal of the current $I_o$ provides for stabilized arcing, rules out short-circuiting of the electrode 1 with the article 2 in the course of welding and does not effect melting of the electrode metal.

When in the power circuit A, wherein the integrator is not provided for, the contactor 31 and the electrode 1 are shorted with the article 2 within the time $\tau_1$, during which time the voltage $U_{18}$ pulse is present at the output of the controlled rectifier 10, the current in the circuit of the induction coil 22 begins to increase from zero. Under the action of the increasing current, the energy accumulates in the magnetic field of the induction coil 22, and the tip of the electrode 1 begins to fuse, thereby gradually disconnecting the electric circuit and forming the arc. As this occurs, the voltage across the electrode 1-article 2 gap increases due to a strong self-inductance e.m.f. in the circuit. Over-voltage thus produced causes intensive fusion of the electrode and, as a result, arc extinguishing. Repeated shorting of the electrode 1 with the article 2 results in the same occurrence without producing stable arcing.

Thus, the integrator 26 connected at the points 21 and 30 of the power circuit A and comprising the series connected capacitor 28 and resistor 27 having a section shunted by the diode 29 in the direction which is non-conductive for the charging current of said capacitor, provides, at the beginning of the welding, the ignition of the arc and maintains stability thereof in case of short-circuiting in the course of welding.

Test welding is accomplished with the tumbler switch 102 being in "off" position. For this purpose, with the voltage across the voltmeter 70 of the unit 36 for setting the mean arc voltage, not being zero, with the aid of the variable resistor 73, the resistor-type voltage divider 37, the contact breakers 90 and 91, the blocking generator 41, and the switches 7 and 25, there are set such parameters which would provide for the optimum process of the welding ensuring the required quality of the weld. The mean arc voltage in the process of the test welding is determined with the aid of the voltmeter 98. In this case, the unbalancing signal amplifier 34 and the voltage pulse shape relaxation inverter 35 are fed, through the normally closed contact 108a, the voltage from the unit 36 for setting the mean arc voltage arbitrarily set with the aid of the variable resistor 67. The integrator including the variable resistor 27, the capacitor 28 and the diode 29 provides, at the beginning of the welding process, for the arc ignition between the electrode 1 and the article 2 and for maintaining the stability of arcing.

After the test welding is finished the voltage is set equal to that measured in the process of the test welding by the voltmeter 98 with the aid of the variable resistor 67 and the voltmeter 70, and the tumbler switch 102 is set to its "on" position. Thus prepared, the proposed apparatus is ready for welding and surfacing of articles, with the mean arc voltage being automatically maintained, thereby providing, in the presence of disturbances, for stable arcing and a high quality weld.

At the moment the contactor 31 is closed and the electrode 1 is shorted with the article 2, the voltage between the points 30 and 21 of the power circuit A across the capacitor 96 of the unit for measuring the mean arc voltage and, hence, between the emitter and the base electrodes of the transistor 99, is zero, and said transistor becomes non-conducting. In this case, the transistor 104 is rendered conductive by the basic current flowing through the resistors 105 and 103, and the voltage between its emitter and collector electrodes, and hence across the winding of the electromagnetic relay 107, is zero. The unbalancing signal amplifier 34 and the voltage pulse shape relaxation converter 35 are fed, through the normally closed contact 108a of the electromagnetic relay 108, the voltage from the unit 36 for setting the mean arc voltage, which voltage is set with the aid of the variable resistor 67, with the duration $\tau_1$ of the voltage pulses not changing.

After the arc is ignited, a voltage appears between the electrode 1 and the article 2 which is averaged with the aid of the integrators comprising the variable resistors 92 and 94 and the capacitors 93 and 95. When the voltage across the capacitor 96 assumes a value sufficient for driving the transistor 99 from non-conduction into the saturation state, the transistor 104 becomes non-conductive, since the voltage between its emitter and base electrodes is zero. In this case, a release current flows through the winding of the relay 107 and the resistor 106 thereby closing its normally open contacts 107a and 107b. The closing of the contact 107a causes the flow of the release current of the relay 108 and, accordingly, disconnection of the normally closed contact 108a, in which case the unbalancing signal amplifier 34 and the voltage pulse shape relaxation inverter 35 will be fed the mean arc voltage.

If a section $U_{10}=U_{11}$ of the voltages $U_{10}$ and $U_{11}$ which are applied to the resistance voltage divider 37 and the voltage pulse shaping converter 35 (FIGS. 6f and 7a) are equal, the duration $\tau_1$ of the voltage $U_{18}$ does not change and remain the same as during the test welding, that is, when the apparatus operates as an open circuit.

In the course of welding of the article 2, the welding arc may be subject to considerable disturbances, which are normally caused by variations in the supply source 8, uneven feeding of the electrode 1 to the welding bath because of imperfections in the feeding means, changes in the length of the arc gap in semiautomatic manual welding and other factors. The aforementioned disturbances occurring in the process of welding may cause changes in the mean arc voltage and the mean welding current, which impairs the quality of the weld or the surfacing of the article.

Therefore, if for some reason in the course of welding or surfacing the mean arc voltage $U_{11}$ across $U_{10}<U_{11}$ across the capacitor 96 increases relative to the preset voltage $U_{10}$ (section $U_{10}<U_{11}$ in FIG. 7a), the voltage $U_9$ (FIG. 7b, section $U_{10}<U_{11}$) across the resistor 63 changes, which results in reduction of duration $\tau_1$ (FIG. 8c, section $U_{10}<U_{11}$) of the pulse voltage $U_{18}$ at the output of the controlled rectifier 10. The mean value of the arc voltage decreases to the required value and thus, the length of the arc gap and the mean value of the welding current will be restored.

Figure 7A:
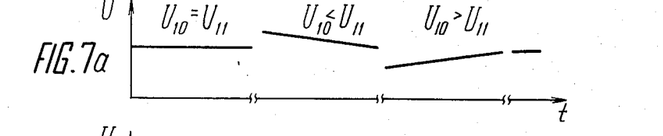
Figures 7B, 7C:
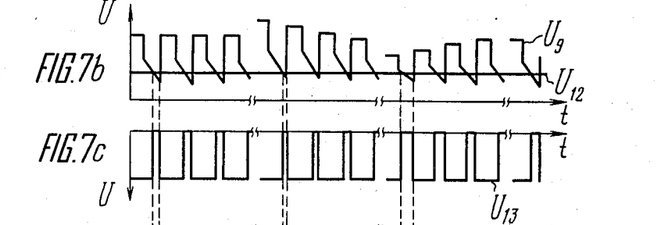
Figures 7D, 7E, 7F:
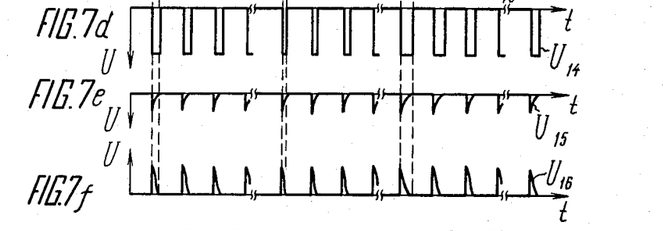
Figure 8A:
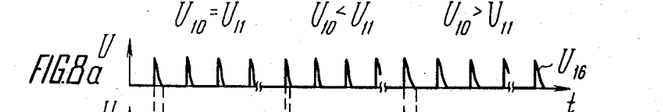
Figures 8B, 8C:
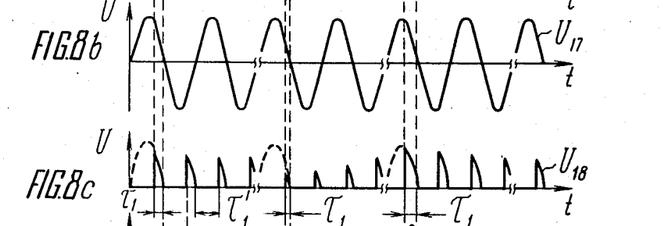
Figure 8D:
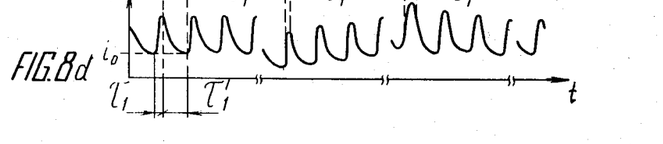

With the decrease of the mean arc voltage $U_{11}$ section $U_{10} > U_{11}$ of FIGS. 7a and 8a) the pulse duration $\tau_1$ of the voltage $U_{18}$ (FIG. 8c, section $U_{10} > U_{11}$) increases thereby restoring the operating parameters of the welding.

To stop a welding operation, the contactor 31 is disconnected, thereby cutting off the current in the welding circuit, and the voltage between the electrode 1 and the article 2 becomes zero. In this case, the transistor 99 is rendered non-conductive and the transistor 104 becomes conductive, the contacts 107a and 107b of the relay 107 and the contact 108a of the relay 108 take their initial position, whereas the unbalancing signal amplifier 34 and the relaxation converter 35 voltage pulse shape are fed by the unit 36 for setting the mean arc voltage.

In case of minor disturbances, the apparatus of the invention can operate as an open circuit, in which case the tumbler switch 102 is set to its "OFF" position, whereby the unit 42 for switching off the automatic control of the mean arc voltage is cut off.

The operating mode of the apparatus including the power circuit shown in FIG. 3, differs from the afore-described operation in that within the time $\tau_1'$, when the pulse voltage $U_{18}$ is zero and the induction coil 22 begins to release the energy of its magnetic field into the welding circuit, the welding current I flows through the diode 110. In what follows, the operation of the apparatus is similar to that described.

The presence of the induction coil 22 with variable nonlinear inductance and the integrator 26 which comprises the variable resistor 27 and the capacitor 28, and wherein a section of the variable resistor 27 is bypassed by the diode 29 in the non-conducting direction for the capacitor 28 charging current, permits the exclusion of an arc-welding rectifier, which until the present time has always been in pulsed arc welding, and permits the power circuit control unit to be simplified, because the apparatus of the invention provides for the feeding of the arc with both the basic current and current pulses simultaneously.

It also makes it possible to manage without a six-phase rectifier, discharge capacitors and an auxiliary rectifier, and a three-phase transformer is replaced by a single-phase transformer.

If the apparatus of the invention incorporates a control unit C of the power circuit A, as shown in FIG. 5, it operates as follows.

Similarly to the aforedescribed operation, the sawtooth voltage $U_5$ (FIG. 6c) is formed at the output of the stable frequency sawtooth voltage generator 32. This voltage is compared to the direct voltage $U_6$ produced by the resistor-type voltage divider 37 which functions as a setter. An unbalancing signal, which is the difference between the voltages $U_5$ and $U_6$, is applied to the input of the unbalancing signal amplifier 34, and, upon being amplified, is fed to the input of the voltage pulse shape relaxation converter 35. A voltage $U_8$ (FIG. 6e) is formed at the output of the converter 35 and is compared with the output voltage of the square pulse generator 111.

Figure 9A:
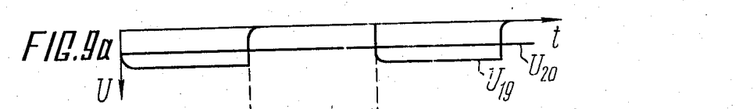
FIGS. 9a, 9b, 9c, 9d, 9e, 9f, 10a, 10b, 10c and 10d are time plots illustrating the operation of the apparatus of FIGS. 4 and 5, according to the invention.
Figure 9B:
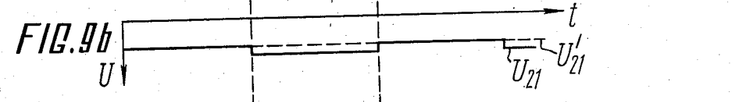
Figure 9C:
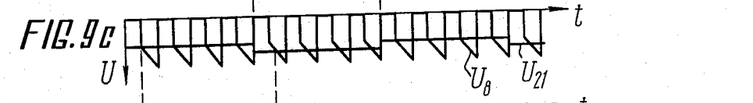

The square pulse generator 111 operates as follows. A square voltage $U_{19}$ (FIG. 9a) is formed at the multivibrator output between the emitter and the collector electrodes of the transistor 113. The square voltage $U_{19}$ is compared with the direct voltage $U_{20}$ (FIG. 9a) across the resistor 126 of the resistor-type voltage divider having resistors 126 and 127. When the voltage between the emitter and collector electrodes of the transistor 113 is less than the direct voltage $U_{20}$, the transistor 129 becomes saturated, and the resistance of its emitter-collector junction is zero, thereby shunting a section of the variable resistor 132 and increasing the voltage across the capacitor 135. Thus, a square voltage $U_{21}$ appears across the capacitor 135. The square voltage $U_{21}$ has the preset pedestal value $U_{21}'$ (FIG. 9b) across the capacitor 135. The level at the pedestal voltage $U_{21}'$ is determined by the resistance of that section of the resistor-type voltage divider which is connected between the plates of the capacitor 135. The voltage $U_{21}$ is the output voltage of the square pulse generator 111. As hereinbefore pointed out, the output voltage $U_8$ of the voltage pulse shape relaxation converter 35 is compared with the output voltage $U_{21}$ of the square pulse generator 111, the voltage difference being applied to the unbalancing signal amplifier 38.

Figure 9D:
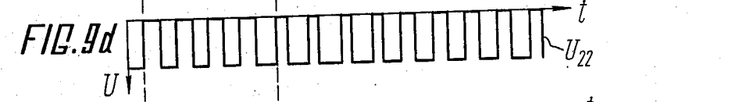
Figure 9E:
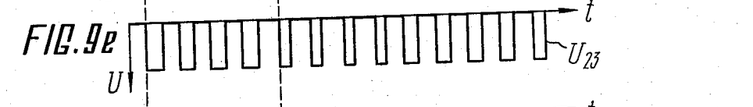
Figure 9F:
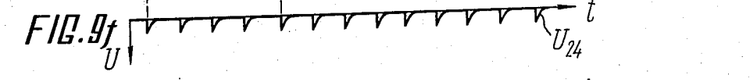
Figures 10A, 10B:
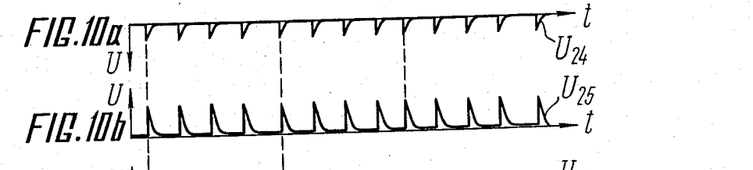
Figure 10C:
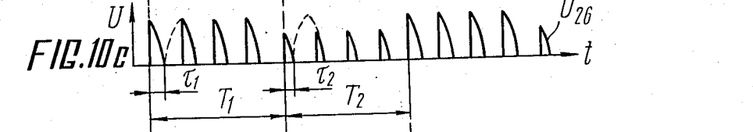

A voltage $U_{22}$ (FIG. 9d) is formed at the output of the unbalancing signal amplifier 38 and is applied to the input of the invertor 39. Inversed voltage $U_{23}$ (FIG. 9e) is passed to the differentiating circuit 40, at the output of which there appears a pulse voltage $U_{24}$ (FIGS. 9f and 10a). The voltage $U_{24}$ is applied to the input of the blocking generator 41, thereby starting said generator. As a result, a voltage $U_{25}$ (FIG. 10b) appears at the outputs of the blocking generator 41 of control the thyristors 11 and 12.

Figure 10D:
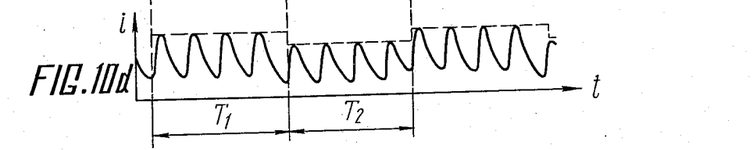

Since the moment of the formation of the pulse voltage $U_{25}$ depends on the moment of comparing the output voltage $U_8$ (FIG. 6c) of the voltage pulse shape relaxation converter 35 with the output voltage $U_{21}$ of the square pulse generator 111, the pulse duration $\tau_1$ and $\tau_2$ (FIG. 10d) and the time intervals $T_1$ and $T_2$ of their action at the outputs of the controlled rectifier 10 change respectively (FIG. 10d).

If the gap between the electrode 1 and the article 2 is zero within the time $\tau_1$ and $\tau_2$ when the pulse of voltage $U_{26}$ is applied, the capacitor 28 is charged through the induction coil 22 and the variable resistor 27, whereas in the absence of the pulse, said capacitor discharges through the section of the variable resistor 27 adjacent thereto, the diode 29, the induction coil 22, and the variable resistor 19. Since the resistance of the variable resistors 19 and 27 are selected so that the discharge time of the capacitor 28 is considerably longer than its charging time, a direct voltage appears across the capacitor 28 which exceeds the means pulse voltage $U_{26}$, but is less than its peak value at the corresponding time intervals $T_1$ and $T_2$.

The welding arc between the electrode 1 and the article 2 is formed by causing the electrode 1 to contact the article 2 and then moving it away at a required distance. At the moment of contacting, with the voltage $U_{26}$ at the outputs of the controlled rectifier 10, the current magnitude in the circuit of the induction coil 22 and the arc gap is zero. This is explained by the fact that at the moment the circuit is closed, the current in said circuit having inductance cannot instantaneously assume the limit value.

However, since the contacting of the electrode 1 and the article 2 requires some time, a high transition resistance appears between said electrode and said article. At the same instant of time, the preliminary charged capacitor 28 begins to discharge through the section of the variable resistor 27 connected in parallel, the diode 29 and the arc gap between the electrode 1 and the article 2.

The spark, which occurs between the electrode 1 and the article 2, ionizes said gap and the welding arc is ignited therein.

In what follows, the operation of the apparatus of the invention is similar to that described.

In the described embodiment of the apparatus for pulsed arc welding and surfacing of articles the modulation of welding current is performed by varying the voltage applied to the electrode 1-article 2 gap.

Such modulation mode is advantageous from the point of view of energy consumption and economy since the energy is consumed only by the welding arc.

The possibility of simultaneously varying the duration of the modulating pulse, as well as the amplitude, duration and frequency of pulses of the signal being modulated, considerably increases the range of controlling the effective thermal power of the welding arc.

With the above mentioned parameters the proposed embodiments of the apparatus permits the burning of alloying ingredients to be considerably decreased, thereby improving mechanical properties of welds. Thus, for example, the mechanical properties of the weld obtained when welding aluminium-magnesium alloys with the apparatus of the invention using consumable electrodes, constitutes 0.9 of the property of the basic metal, as in welding with nonconsumable electrodes. With existing equipment these properties would be from 0.75 to 0.8.

The use of consumable electrodes in the proposed apparatus instead of non-consumable ones permits the productivity of welding to be increased from three to five times, and the cost of welding to be decreased due to decreased consumption of welding materials.

Smooth sloping of the trailing pulse edge according to a law which is close to the exponential law ensures stable arcing in welding articles having a thickness of 1 cm and more.

Apart from the foregoing advantages of the use of consumable electrodes, there is considerably reduced deformation of articles being welded and hence expenses associated with the removal of such deformation, which in turn improves the utilization possibilities of the apparatus.

All the above advantages make it possible to reduce the cost of the equipment, simplify the construction thereof and reduce the production space for the equipment in question.

We claim:

1. A pulsed arc welding and surfacing apparatus comprising a power circuit including an article to be welded;

a single-phase output voltage regulated leakage transformer having a primary winding connected to a power supply, and a secondary winding;

a controlled bridge rectifier electrically connected to the secondary winding of said transformer, said controlled bridge rectifier having controlled rectifiers, a positive output and a negative output electrically connected to said article to be welded;

an induction coil having a variable non-linear inductance connected to the positive output of said controlled bridge rectifier;

a variable resistor connected to said positive and negative outputs of said controlled bridge rectifier, said variable resistor varying the output voltage of said apparatus during no-load running thereof;

an integrator including a variable resistor having a first lead electrically connected to said induction coil, said variable resistor of said integrator having a second lead and a movable electrode for varying the output thereof, a capacitor connected to the second lead of said variable resistor of said integrator and to the negative output of said controlled bridge rectifier, and a diode electrically connected between the movable electrode of said variable resistor of said integrator and said induction coil thereby shunting a section of said variable resistor between said movable electrode and said first lead of said variable resistor, said diode being connected with a polarity preventing the passage therethrough of the charging current of said capacitor; and a power circuit control unit acting upon the power circuit to permit the welding arc to be fed a current the variation of which in time can be represented in the form of a sum curve of a direct current component and a periodic curve, said sum curve having its leading edge rising approximately linearly and its trailing edge falling approximately exponentially, said power circuit control unit being electrically connected to said controlled bridge rectifier.

2. A pulsed arc welding and surfacing apparatus as claimed in claim 1, further comprising a diode having an anode electrically connected to said negative output of said controlled bridge rectifier and a cathode electrically connected to said positive output of said controlled bridge rectifier.

3. A pulsed arc welding and surfacing apparatus as claimed in claim 1, wherein said induction coil has a ratio of non-saturated inductance to saturated inductance exceeding 40.

4. A pulsed arc welding and surfacing apparatus as claimed in claim 1, wherein the power circuit control unit includes a welding unit for welding the article to be welded, said welding unit having an electrode;

a measuring unit for measuring the mean arc voltage value, said measuring unit having inputs electrically connected to the plates of said capacitor of said integrator of said power circuit, said inputs being the inputs of said power circuit control unit, integrators connected in series with each other, and outputs;

a cutoff unit for cutting off an arc mean voltage automatic control if the electrode of the welding unit is shortcircuited with said article to be welded, said cutoff unit having inputs electrically connected to the outputs of said measuring unit, and outputs;

a voltage pulse shape relaxation converter having a first input electrically connected to an output of said cutoff unit, a second input and an output;

a first unbalancing signal amplifier having a first input, a second input electrically connected to an output of said cutoff unit and an output electrically connected to the second input of said relaxation converter;

a stable frequency sawtooth voltage generator having an output electrically connected to the first input of said first unbalancing signal amplifier;

a first resistor-type voltage divider having an output electrically connected to said first input of said first unbalancing signal amplifier so that the output voltage of said first voltage divider and the voltage of said stable frequency sawtooth voltage generator are subtracted;

a setting unit for setting the mean arc voltage, said setting unit having an output;

a second resistor-type voltage divider having an input electrically connected to the output of said setting unit, and an output;

a second unbalancing signal amplifier having an input electrically connected to the output of said voltage pulse shape relaxation converter and to the output of said second resistor-type voltage divider, and an output;

an inverter;

a differentiating network; and a blocking generator having outputs, said inverter, differentiating network and blocking generator being connected in series to the output of said second unbalancing signal amplifier, the outputs of said blocking generator being the outputs of said power circuit control unit.

5. A pulsed arc welding and surfacing apparatus as claimed in claim 1, wherein the power circuit control unit includes a stable frequency sawtooth voltage generator having an output;

a resistor-type voltage divider having an output;

a first unbalancing signal amplifier having a first input electrically connected to the output of said sawtooth generator and to the output of said resistor-type voltage divider, and an output;

a voltage pulse shape relaxation converter having an input electrically connected to the output of said first unbalancing signal amplifier, and an output;

a square pulse generator having an output;

a second unbalancing signal amplifier having an input electrically connected to the output of said voltage pulse shape relaxation converter and to the output of said square pulse generator so that the voltages at the output of said voltage pulse shape relaxation converter and the output of said square pulse generator are subtracted;

an inverter;

a differentiating network; and a blocking generator having outputs, said inverter, differentiating network and blocking generator being connected in series to the output of said second unbalancing signal amplifier, the outputs of said blocking generator being the outputs of said power circuit control unit.

6. A pulsed arc welding and surfacing apparatus as claimed in claim 1, wherein said controlled bridge rectifier has a first controlled rectifier having an anode, a cathode and a control electrode, a second controlled rectifier having an anode electrically connected to the cathode of the first controlled rectifier, a cathode and a control electrode, a first diode having an anode electrically connected to the anode of said first controlled rectifier and a cathode, and a second diode having an anode electrically connected to the cathode of the first diode and a cathode electrically connected to the cathode of said second controlled rectifier, said positive output of said controlled bridge rectifier being a common point in the connection between said second diode and said second controlled diode and said negative output of said controlled bridge rectifier being a common point in the connection between said first diode and said first controlled diode.

7. A pulsed arc welding and surfacing apparatus as claimed in claim 1, wherein said power circuit control unit has a first output electrically connected to the control electrode of said first controlled rectifier and a second output electrically connected to the control electrode of said second controlled rectifier.

8. A pulsed arc welding and surfacing apparatus as claimed in claim 7, wherein said power circuit control unit has a third output electrically connected to a common point in the connection between said first and second controlled rectifiers and a fourth output electrically connected to said positive output of said controlled bridge rectifier.

* * * * *